May 17, 1932.   C. W. WEISS   1,858,696
TRANSMISSION
Filed July 8, 1931   3 Sheets-Sheet 2
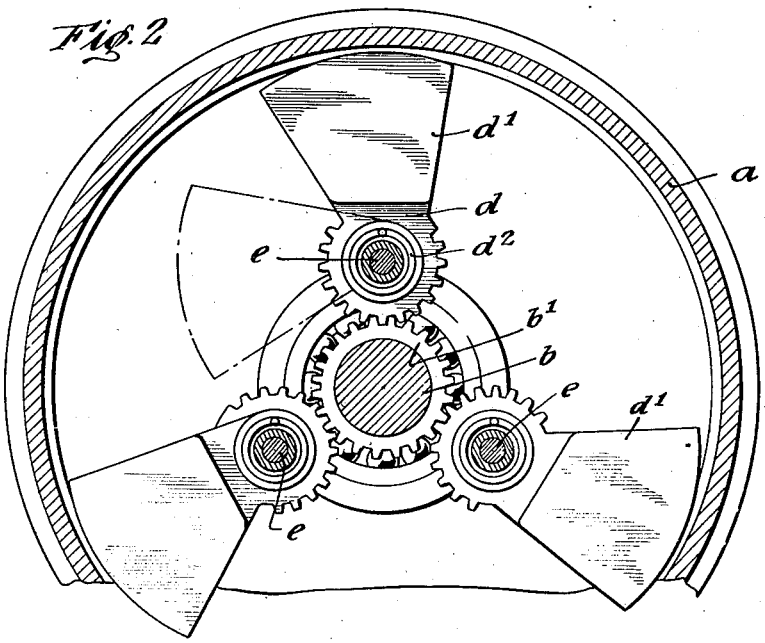
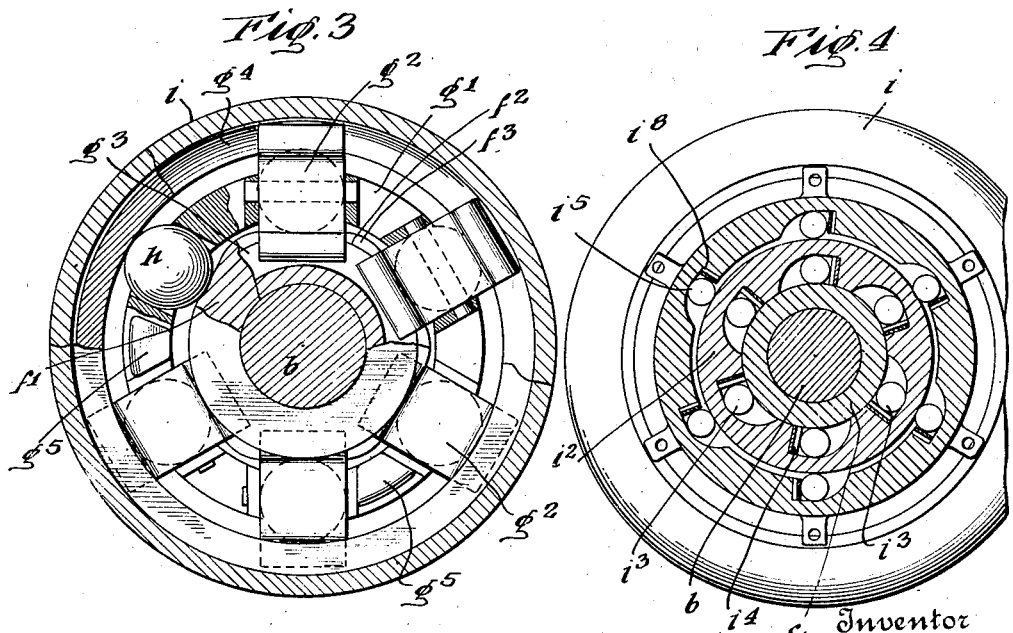
Inventor
Carl W. Weiss
By his Attorneys
Redding, Greeley, O'Shea Campbell

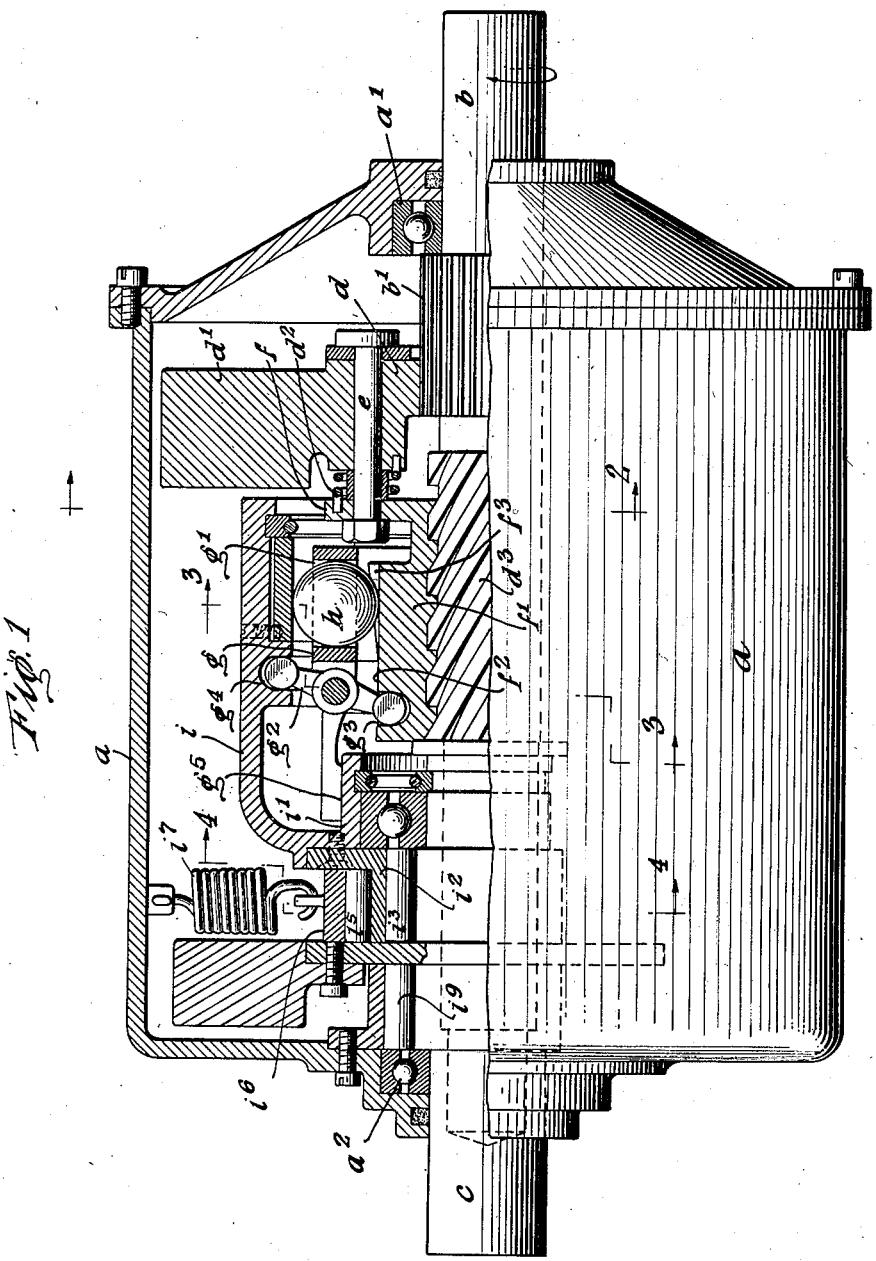

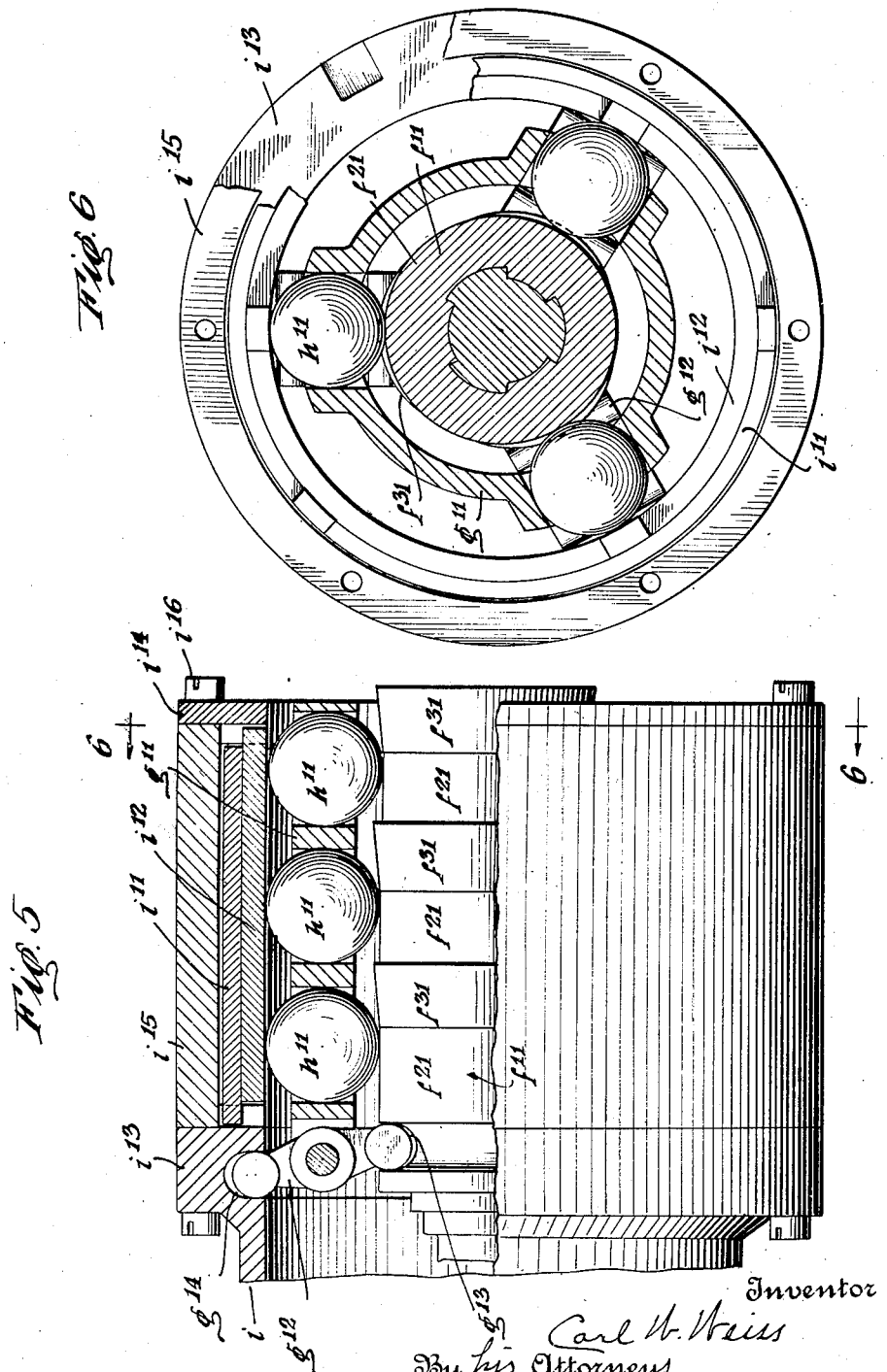

Patented May 17, 1932

1,858,696

UNITED STATES PATENT OFFICE

CARL W. WEISS, OF BROOKLYN, NEW YORK

TRANSMISSION

Application filed July 8, 1931. Serial No. 549,348.

This invention relates to torque controlled, variable speed power transmissions and has for its special object the production of such a transmission in which the driving member, rotating at practically constant angular velocity, causes the driven member to overcome resistance to rotation by torque impulses transmitted through an intermediate body which itself does not tend, either through inertia or centrifugal force or gyrostatic force, to set up torque impulses in the driven member. In accordance with the invention there are mounted on the driving member centrifugal bodies which act upon an intermediate member, rotated with the driving member, to cause the same to effect in varying degree engagement of the intermediate member with the driven member through the medium of rolling bodies; when the intermediate member is in one extreme position the rolling bodies roll freely on their own axes and no movement is imparted to the driven member, while, in the other extreme position of the intermediate member, the rolling bodies are pressed with so much force against the driven member, which may be slightly deformable, that the driven member is rotated with the driving member and with the intermediate member, the speed ratio of transmission being then 1:1. In the embodiment of the invention illustrated the intermediate member, movable in an axial direction, is tapered from a polygonal cross section, near one end of its effective surface, to a truly cylindrical section at or near the other end of its effective surface and spherically rolling bodies are interposed between the intermediate member and the driven member, the action of the non-parallel surfaces of the polygonal section being to force the rolling bodies into such contact with the driven member that the driven member is compelled to rotate with the intermediate body and at the same speed. In the preferred embodiment of the invention the intermediate body is engaged with the driving member through a helical engagement so that relative movement of the intermediate body and the driving member in a direction of rotation effects relative movement in an axial direction, stops being provided to limit the relative movement in an axial direction.

In the embodiment of the invention illustrated in the drawings—

Figure 1 is a view partly in longitudinal section and partly in elevation of a preferred construction.

Figure 2 is a partial view in transverse section on a plane indicated by the broken line 2—2 of Figure 1 looking in the direction of the arrows.

Figure 3 is a detail view in transverse section on the plane indicated by the broken line 3—3 of Figure 1.

Figure 4 is a detail view in transverse section on the plane indicated by the broken line 4—4 of Figure 1, looking in the direction of the arrows.

Figures 5 and 6 are views in longitudinal, sectional elevation and in transverse section respectively, illustrating a slightly different embodiment of the invention.

In the embodiment of the invention illustrated a housing $a$ is provided at one end with a suitable bearing $a^1$ and at the other end with a suitable bearing $a^2$. The driving shaft or member $b$ is received in the bearing $a^1$ and is supported in a driven shaft or member $c$, which in turn is supported in the bearing $a^2$. The driving member $b$ is formed or provided, as at $b^1$, with longitudinally extended gear teeth, with which are engaged the toothed hubs $d$ of the centrifugal bodies $d^1$, shown as three in number, each centrifugal body being engaged by a spring $d^2$ which acts in opposition to centrifugal force and tends to maintain the weight in the position shown in Figure 2. The centrifugal bodies are mounted on studs $e$ which are secured in a flange $f$ of the intermediate member $f^1$, which is shown as mounted on a helically grooved portion $d^3$ of the driving shaft or member $b$. It will be understood that as the centrifugal bodies $d^1$ revolve with the driving shaft $b$, movement of the centrifugal bodies $d^1$, under the influence of centrifugal force, from the position shown in broken lines in Figure 2, when the intermediate body $f^1$ is in its extreme right hand position, to the position shown by full lines in Figure 2, will cause the intermediate body to have a relative movement of rotation, with respect to the driving shaft and, by reason of the helical engagement, to move to the position shown in Figure 1 toward the left hand. It will be understood that the centrifugal bodies move in axial direction with the intermediate body, the toothed hubs $d$ remaining in engagement with the elongated teeth $b^1$ of the driving shaft.

The intermediate member $f^1$ is cylindrical in cross section at or near one end, as shown at $f^2$ in Figures 1 and 3, and at its other end is polygonal in cross section, as shown at $f^3$. Coaxial with the intermediate body $f^1$ is a ball carrier $g$, provided with seats, as at $g^1$, for balls $h$ which are interposed between the intermediate body $f^1$ and a coaxial member $i$ which is a part of the driven member $c$, but for convenience in manufacture is formed independently thereof and is secured thereto. The member $i$ is slightly deformable so that when the driving member and the intermediate member are in direct engagement with the driven member at a 1:1 ratio, there is no rolling movement of the balls, with respect to the intermediate member and the driven member.

The ball carrier and the intermediate member are coupled for longitudinal movement by links $g^2$ which are pivoted on the ball carrier and at their ends engage a circumferential groove $g^3$ of the intermediate member $f^1$ and a groove $g^4$ of the driven member $i$. In the arrangement shown the balls $h$ are thereby moved longitudinally with the intermediate member but through half the distance. The ball carrier may have a bearing, as at $g^5$, on a portion of the driven member $i$, as at $i^1$.

It will be understood that in starting up, with the driven member at rest, the balls $h$ ride on the cylindrical portion of the intermediate member and there is no transmission of power at low speed of the engine. As the speed of the engine is increased the centrifugal bodies are moved from the position shown by broken lines and the intermediate member is therefore moved through its helical engagement with the driving member, in the particular embodiment of the invention shown in the drawings, toward the left hand in Figure 1 in which the intermediate member is shown in its extreme left hand position. As the intermediate member is moved from its extreme right hand position toward its left hand position the balls $h$ will ride on the tapered polygonal portion of the intermediate member. At first, as the movement of the intermediate member toward its left hand position begins, the polygonal portion of the intermediate member will move circumferentially with respect to the balls, the balls riding over the angles of the intermediate member, the torque on the driven member, that is, the resistance of the driven member, being then too great to permit movement of the driven member. This may continue until the centrifugal action of the bodies $d^1$ has brought about the movement of the intermediate member to its extreme left hand position. Between these extremes the relative rolling of the balls $h$ with respect to the intermediate member will depend upon the resistance offered by the driven member and the resistance of the driven member will thus be overcome gradually and rotation of the driven member will be effected at an intermediate and increasing speed. When the speed of the engine has obtained its maximum and the intermediate member $f^1$ has been moved to its extreme left hand position the balls will cease to roll relatively over the polygonal portion of the intermediate member and the driven member will then be driven at the speed of the driving member.

It will be understood further that when a ball rolls relatively over the rounded angles of the polygonal portion of the intermediate member it will tend to roll down the incline beyond the highest point and in the opposite direction. If this action were not accommodated, as will now be described, it would result in a loss in the multiplication of torque exerted on the driven member. Therefore, while the driven shaft is driven from the driven member $i$ through the one-way or roller clutch $i^3$, there is interposed between the flange $i^2$ of the driven member $i$, $i'$ and a floating ring $i^6$ a one-way or roller clutch $i^5$ and the floating ring $i^6$ is connected through springs $i^7$ to the stationary housing $a$. The energy which is stored in the springs $i^7$, by placing them under tension, as thus described, is then exerted through the clutch $i^5$ and is applied to the driven member in the direction of rotation of the driven member.

A roller clutch $i^9$ is preferably provided between the housing and the shaft $c$ to prevent rotation of the shaft $e$ in the wrong direction. The rollers $i^3$, $i^5$ may be cushioned by thin corrugated spring plates, as shown at $i^4$ and $i^8$, and the rollers $i^9$ may be similarly cushioned, all for the purpose of keeping the rollers in constant clutching engagement.

In the embodiment of the invention shown in Figure 1 there is shown a single series of balls interposed between the intermediate body and the driven member. In the embodiment of the invention illustrated in Figures 5 and 6 the intermediate body $f^{11}$ is shown as having a multiple series of cylindrical portions $f^{21}$ and corresponding tapered polygonal portions $f^{31}$, with a mulitple series of balls $h^{11}$ arranged to coact with the several portions of the intermediate body and with the coaxial laminated sleevelike member formed for the purpose of securing greater flexibility of two relatively thin sleeves $i^{11}$ and $i^{12}$ engaged at their ends between an angular portion $i^{13}$ of the driven member and an annulus $i^{14}$ within a sleevelike portion $i^{15}$, the parts being held together by screws $i^{16}$. The balls $h^{11}$ are carried by a ball carrier $g^{11}$ on which are pivoted links $g^{12}$ which engage at their ends a circumferential groove $g^{13}$ of the intermediate member $f^{11}$ and a groove $g^{14}$ of the driven member $i$. This construction permits the use of a greater number of smaller balls and a better distribution of pressures.

While in the embodiments of the invention shown, the movement of the intermediate member is controlled by the centrifugal bodies, it will be understood that the desired longitudinal movement of the intermediate body might be effected by other means.

It will be understood that various changes in details of construction and arrangement can be made to suit different conditions of use or the convenience of the manufacturer and that, except as pointed out in the accompanying claims, the invention is not restricted to the particular construction shown and described herein.

I claim as my invention:

1. In a transmission, the combination of a driving member, a driven member, an intermediate member engaged with the driving member to rotate therewith and having limited relative movement, a rolling body interposed between the intermediate body and the driven member, and means to move the intermediate member longitudinally with respect to the rolling body.

2. In a transmission, the combination of a driving member, a driven member, a tapered intermediate member engaged with the driving member to rotate therewith and having limited relative movement, a rolling body interposed between the intermediate body and the driven member, and means to move the intermediate member longitudinally with respect to the rolling body.

3. In a transmission, the combination of a driving member, a driven member, a tapered intermediate member polygonal at one end and cylindrical at the other end and engaged with the driving member to rotate therewith and having limited relative movement, a rolling body interposed between the intermediate body and the driven member, and means to move the intermediate member longitudinally with respect to the rolling body.

4. In a transmission, the combination of a driving member, an intermediate member engaged with the driving member to rotate therewith and having limited relative movement, a centrifugal body mounted on the intermediate member and having geared engagement with the driving member, and a rolling body interposed between the intermediate body and the driven member.

5. In a transmission, the combination of a driving member, a centrifugal body engaged with the driving member, a driven member, an intermediate member engaged with the driving member to rotate therewith and having limited relative movement, a rolling body interposed between the intermediate body and the driven member, and operative connections whereby the intermediate member is moved through the action of the centrifugal body to vary the engagement of the rolling body with the driven member.

6. In a transmission, the combination of a driving member, a centrifugal body engaged with the driving member, a driven member, a tapered intermediate member engaged with the driving member to rotate therewith and having limited relative movement, a rolling body interposed between the intermediate body and the driven member, and operative connections whereby the intermediate member is moved through the action of the centrifugal body to vary the engagement of the rolling body with the driven member.

7. In a transmission, the combination of a driving member, a centrifugal body engaged with the driving member, a driven member, a tapered intermediate member polygonal at one end and cylindrical at the other end and engaged with the driving member to rotate therewith and having limited relative movement, a rolling body interposed between the intermediate body and the driven member, and operative connections whereby the intermediate member is moved through the action of the centrifugal body to vary the engagement of the rolling body with the driven member.

8. In a transmission, the combination of a driving member, a centrifugal body engaged with the driving member, a driven member, an intermediate member having a helical engagement with the driving member to rotate therewith and having limited relative movement rotarily and longitudinally, a rolling body interposed between the intermediate body and the driven member, and operative connections whereby the intermediate member is moved through the action of the centrifugal body to vary the engagement of the rolling body with the driven member.

9. In a transmission, the combination of a driving member, a driven member, a tapered intermediate member polygonal at one end and cylindrical at one end and engaged with the driven member to rotate therewith and having limited relative movement, a rolling body interposed between the intermediate body and the driven member, means to move the intermediate member longitudinally with respect to the rolling body, a floating ring, springs supporting the ring, and a one-way roller clutch interposed between the driven member and the floating ring.

10. In a transmission, the combination of a driving member, a driven member, an intermediate member engaged with the driving member to rotate therewith and having limited relative movement, a rolling body interposed between the intermediate body and the driven member, a carrier cooperating with the rolling body, and means to move the intermediate member longitudinally with respect to the rolling body.

11. In a transmission, the combination of a driving member, a driven member, an intermediate member engaged with the driving member to rotate therewith and having limited relative movement, a rolling body interposed between the intermediate body and the driven member, a carrier cooperating with the rolling body, a link connection between the intermediate member, the carrier and the driven member, and means to move the intermediate member longitudinally with respect to the rolling body.

12. In a transmission, the combination of a driving member, a driven member, an intermediate member engaged with the driving member to rotate therewith and having limited relative movement, a circumferential series of rolling bodies interposed between the intermediate body and the driven member, a carrier cooperating with the rolling bodies, and means to move the intermediate member longitudinally with respect to the rolling body.

13. In a transmission, the combination of a driving member, a driven member, an intermediate member engaged with the driving member to rotate therewith and having limited relative movement, a circumferential series of rolling bodies interposed between the intermediate body and the driven member, a carrier cooperating with the rolling bodies, a link connection between the intermediate member, the carrier and the driven member, and means to move the intermediate member longitudinally with respect to the rolling body.

This specification signed this 3rd day of July, A. D. 1931.

CARL W. WEISS.